Jan. 31, 1939.  E. D. LILJA  2,145,267
SENSITIVE CONTROL SYSTEM
Filed Nov. 16, 1934  2 Sheets-Sheet 1

INVENTOR
Edgar D. Lilja
BY
Chindall, Parker Carlson.
ATTORNEYS

Jan. 31, 1939.　　　　E. D. LILJA　　　　2,145,267
SENSITIVE CONTROL SYSTEM
Filed Nov. 16, 1934　　　　2 Sheets-Sheet 2

INVENTOR
Edgar D. Lilja
BY
ATTORNEYS

Patented Jan. 31, 1939

2,145,267

UNITED STATES PATENT OFFICE 2,145,267

SENSITIVE CONTROL SYSTEM

Edgar D. Lilja, Rockford, Ill., assignor, by mesne assignments, to Barber-Colman Company, Rockford, Ill., a corporation of Illinois Application November 16, 1934, Serial No. 753,320

8 Claims. (Cl. 236—76)

This invention relates to sensitive control instruments such as are used in conjunction with temperature regulating systems and the like.

More particularly the invention relates to those systems in which the control is normally effected by relative movement between coacting contacts while the latter are in engagement with each other.

The general object of the invention is to increase the sensitivity of control instruments in systems of the above character through the provision of a novel means which operates to relieve the friction at the engaging contact surfaces and which is simple and inexpensive in construction and automatic and durable in its operation.

A more detailed object is to provide a control instrument of the above character in which the coacting contact members are moved intermittently out of engaging relation by alternately heating and cooling a thermostatic member arranged to move the contact members relative to each other in a direction transverse to the movement produced by the sensitive control element with which the members are associated.

The invention also resides in the novel character of the means for effecting heating and cooling of the thermostatic member above mentioned.

Other objects and advantages of the invention will become apparent from the following detailed description taken in connection with the accompanying drawings, in which Figure 1 is a front elevational view of a thermostat embodying the features of the present invention, a portion of the thermostat casing being broken away.

Figure 1:
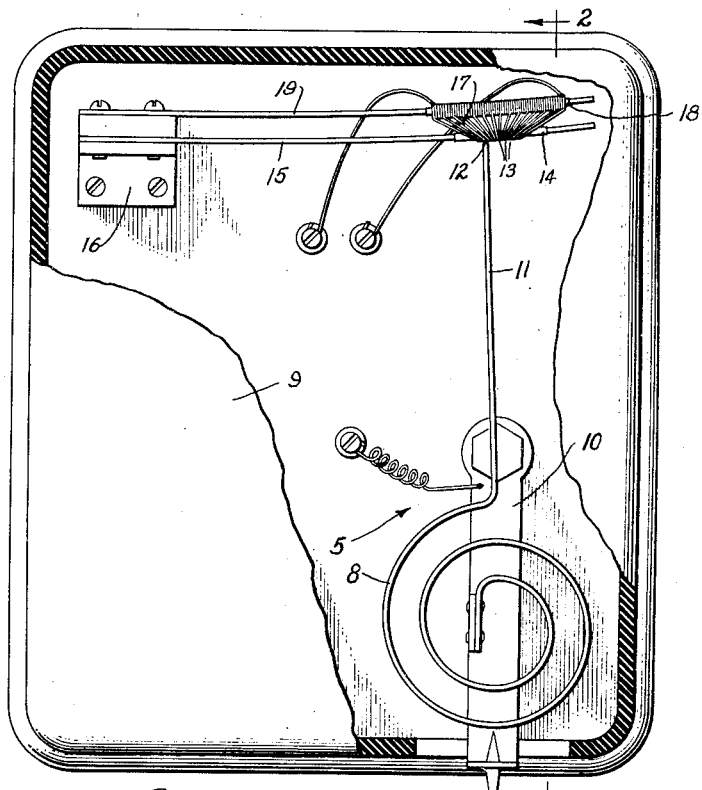
Figure 2:
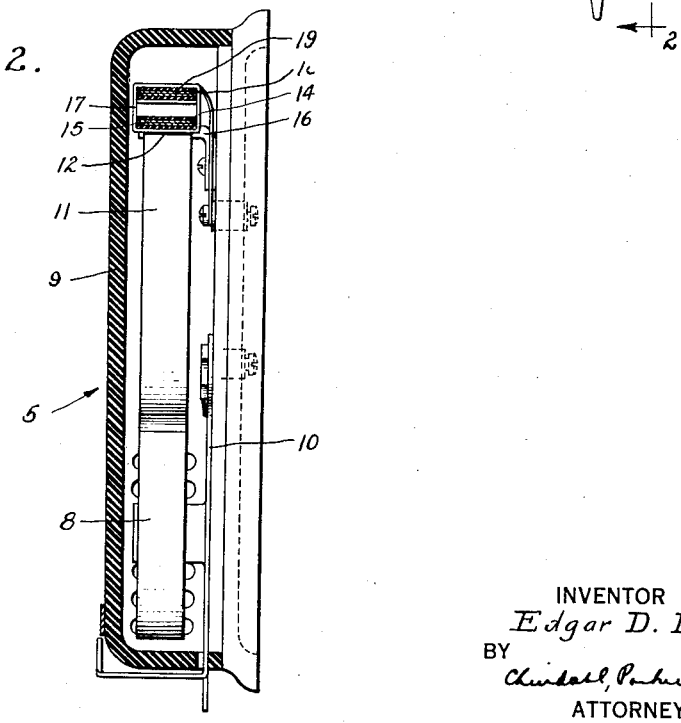
Fig. 2 is a sectional view taken along the line 2—2 of Fig. 1.
Figure 3:
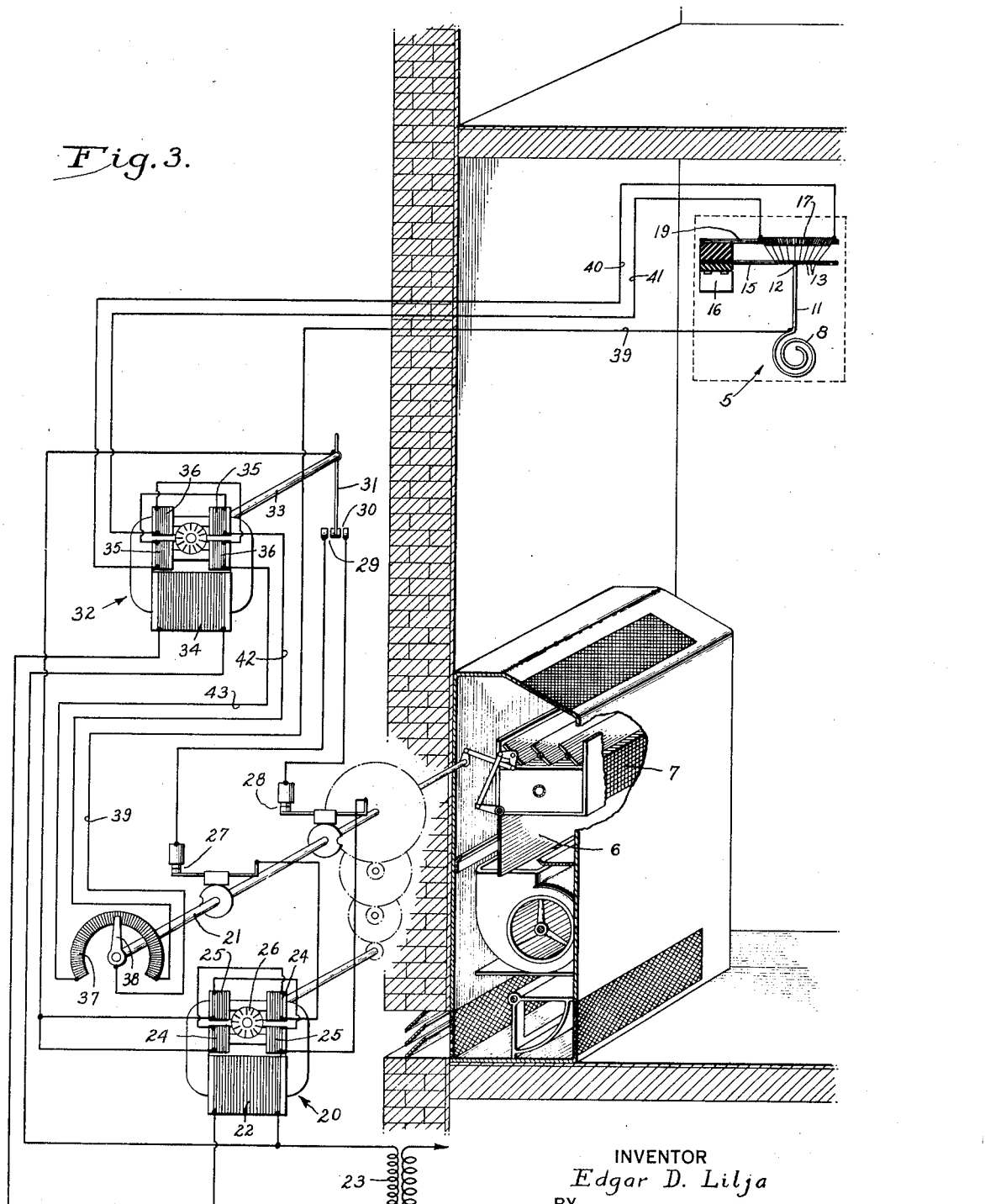
Fig. 3 is a schematic view and wiring diagram of a temperature regulating system in which the invention may be utilized.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the invention is embodied in a thermostat generally designated by the numeral 5 and utilized to control a system by which the movement of a regulating device such as a by-pass damper 6 for varying the effectiveness of a heater 7 is governed in accordance with temperature changes detected by the thermostat. The sensitive control element of the thermostat comprises the usual coil 8 of bimetallic material disposed within a casing 9 and having one end secured to a lever 10 to adjust the control point of the thermostat as desired. Projecting from the other end of the element 8 is an elongated member or tongue 11, the end 12 of which constitutes an electrical contact which moves laterally back and forth varying distances according to the prevailing temperature of the air to which the element 8 is exposed.

Cooperating with the contact 12 to form an electric circuit controlling mechanism are a plurality of contacts 13 separated from each other by insulation and closely spaced along an insulating member 14 in the direction of movement of the contact 12. In accordance with the present invention, the contacts 13 are mounted for movement into and out of engaging relation with respect to the contact 12. To this end, the insulating member 14, which may comprise a wrapping of mica, is mounted on the free end of a bar 15 of thermostatic metal extending across the end of the tongue 11 and secured at its other end to a bracket 16 on the rear wall of the casing 9.

In the present instance, the contacts 13 constitute parts of a length of enameled resistance wire 17 coiled around the member 14 and a similar member 18 spaced therefrom with sections of the adjacent turns of the wire disposed closely adjacent each other on the member 14. The contacts 13 are formed by removing the enamel insulation along the side of the coil 17 facing the tongue contact 12. To maintain the shape of the coil, the member 18 is mounted on a second bar 19 of thermostatic metal also secured to the bracket 16. Two thermostatic strips are used for the purpose of increasing the amount of resistance between the adjacent contacts 13 without causing undue heating or necessitating the use of impractically fine wire. Thus, on the bar 19, there may be several turns of the wire for each of the contacts 13.

The bars 15 and 19 are so arranged relative to the tongue that at normal temperatures the contacts 13 will be pressed against the contact 12 with sufficient pressure to complete an electric circuit through the engaged contacts. But when the bars are heated to a temperature slightly above the maximum temperature at which engagement of the contacts 12 and 13 occurs, they will warp and carry the contacts 13 out of engagement with the tongue contact 12. With the contacts thus disengaged, the tongue is free to move under the action of the sensitive element 8, and since friction between the engaging contacts is thus eliminated, the tongue contact will, when freed, assume a definite position for a given temperature of the thermostatic element 8.

To cause intermittent engagement of the contacts 12 and 13, automatically acting means is provided for heating the thermostatic elements 15 and 19 whenever the tongue contact is in engagement with any one of the contacts 13. In the present instance, this means is formed by the resistance coil 17 operating in conjunction with a control system of the so-called potentiometer type forming the subject matter of a co-pending application by George Forrest Drake, Serial No. 720,835, filed April 16, 1934, and operating to control the direction and extent of operation of a reversible electric motor 20 geared to a shaft 21 from which the damper 6 is operated. Preferably, the motor is of the shaded pole induction type having a main winding 22 constantly energized from a source 23 of alternating current and a rotor 26 adapted to rotate in one direction or another according to which of two pairs of shading coils 24 and 25 is short-circuited to produce shifting of the magnetic field around the rotor recess. The coils 24 and 25 are arranged in parallel circuits including limit switches 27 and 28 which are open in opposite limit positions of the damper, and switches 29 and 30 closed by movement of an arm 31 between two limit positions in which the respective switches are closed.

The switch arm 31 is carried by the movable armature of a relay 32 which preferably comprises an electric motor constructed similar to the motor 20 with the arm 31 fast on the motor shaft 33. The relay has a constantly energized main winding 34, and the direction of movement of the arm 31 is controlled by shading coils 35 and 36 which constitute the sources of current for the two parallel circuits of the potentiometer system. Each of these circuits includes a part of the resistance coil 17 and a part of a resistance element 37 engaged by a wiper arm 38 fast on the damper operating shaft 21. Both of the circuits include a common conductor 39 which extends from the tongue 11 of the thermostat 5 to the wiper arm 38. Opposite ends of the resistance coil 17 are joined by conductors 40 and 41 to the shading coils 35 and 36, the other terminals of which are connected by conductors 42 and 43 to the opposite ends of the resistance element 37.

With the circuit arrangement above described, it will be observed that when the tongue contact 12 is in engagement with any one of the contacts 13, the two circuits through the shading coils 35 and 36 will be closed, the switch arm 31 being moved in a direction determined by the shading coils exerting the predominating shading effect, that is, the coils which are in the circuit of lower resistance. When the resistances of the two circuits are balanced, the arm 31 will be disposed in the neutral position shown as by means of a spring (not shown), the motor 20 then being idle and the damper 6 being held against movement. Now if the tongue 11 moves into engagement with a different contact 13, the resistance balance will be destroyed resulting in closure of the relay switches which will cause movement of the damper in a direction such as to change the rate of heat delivery and compensate for the change in temperature which produced the tongue movement. The motor 20 continues in operation until a balance has abain been established in the potentiometer system. In this way, the damper follows the movements of the thermostatic tongue.

Whenever the coil 17 is energized by the voltages induced in the relay shading coils, as it will be whenever the tongue contact 12 engages one of the contacts 13, the bimetallic elements 15 and 19 will be heated. This results in a warping of the elements in a direction to carry the contacts 13 out of engaging relation with respect to the contact 12, the disengagement occurring after a temperature rise of a few degrees. Such deenergization of the coil 17 results in interruption of both of the circuits through the shading coils 35 and 36 whereupon the heater coil and the thermostatic elements 15 and 19 cool allowing the contacts 13 to be moved back into engagement with the tongue contact for a repetition of the cycle. In this way, the contacts 12 and 13 are disengaged intermittently, and during such disengagement the tongue 11 is free to move under the action of the sensitive thermostatic element 8.

I claim as my invention:

1. A control system of the class described comprising, in combination, a regulating device, a power operator for imparting progressive movements to said device in opposite directions, a potentiometer system controlling the operation of said operator including two circuits, a resistance element and contacts coacting to determine the proportions of said element interposed in said circuits, a sensitive control element responsive to changes in the condition regulated by said device and operating to effect relative movement between said contacts to vary the relative resistance of said circuits, and a thermostatic means associated with said resistance element and adapted when heated thereby to a predetermined temperature to move said contacts out of engaging relation.

2. A control system of the class described comprising, in combination, a sensitive instrument having engageable contacts movable relative to each other in response to changes in a condition to be controlled, a device for regulating said condition, a power operator for imparting progressive movements in opposite directions to said device, an electric potentiometer system controlled by said instrument and controlling said operator, and electrical means deriving energy from said potentiometer system and operating periodically and independently of the condition of said instrument to move said contacts out of engaging relation.

3. A control system of the class described comprising, in combination, a sensitive instrument having engageable contacts movable relative to each other in response to changes in a condition to be controlled, a device for regulating said condition, a power operator for imparting progressive movements in opposite directions to said device, an electric system controlled by said instrument and governing the operation of said operator to determine the direction and extent of movement of said device thereby, a thermostatic member adapted when heated to move said contacts out of engaging relation, and an electric heater for said member energized from said system.

4. A control system of the class described comprising, in combination, a sensitive instrument having engageable contacts movable relative to each other in response to changes in a condition to be controlled, a device for regulating said condition, a power operator for imparting progressive movements in opposite directions to said device, an electric potentiometer system controlled by said instrument, a thermostatic member adapted when heated to move said contacts out of engaging relation, and an electric resistance constituting an element of said system and acting to heat said member.

5. In a control system, the combination of a member having a contact thereon, a second member having two spaced contacts adapted for engagement with said first mentioned contact, a sensitive control element for effecting relative movement between said members in the direction of spacing of said second contacts, means supporting one of said members for movement in a direction transversely of the path of said relative movement to carry said contacts into and out of engaging relation including a thermostatic element adapted when heated to move said members away from each other, and means for heating said thermostatic element during the engagement of said first contact with either of the other contacts whereby to disengage the members and permit freedom of relative movement therebetween by said sensitive element.

6. A control of the character described having, in combination, a contact member, a sensitive control element for moving said member in opposite directions, a second contact member engageable therewith elongated in the direction of movement of said first mentioned member and engageable with the first member in different positions of the latter, and mechanism set in operation as an incident to engagement of said members and operating after the lapse of a time interval to move the members relative to each other out of engaging relation.

7. A control of the class described having, in combination, a contact member, a sensitive control element for moving said member, a second contact member elongated in the direction of movement of said first mentioned member by said element so as to be engageable therewith in different positional relations, a thermostatic element arranged to move said second member into and out of engaging relation with respect to said first member, and means operating automatically to effect alternate heating and cooling of said thermostatic element.

8. A control of the class described having, in combination, a contact member, a sensitive control element having an elongated transversely movable tongue carrying said member, a second contact member, one of said members being elongated in the direction of movement of said tongue, means supporting said element and said second contact member for relative movement in a direction longitudinally of said tongue and also transversely of said elongated contact member whereby to cause the contact pressure to be transmitted to said tongue in a direction endwise thereof, and mechanism operating independently of the condition of said element to move the members into and out of engagement intermittently.

EDGAR D. LILJA.